Patented Oct. 29, 1946

2,410,008

UNITED STATES PATENT OFFICE 2,410,008

CHEMICAL COMPOUNDS

Joseph E. Bludworth and Donald P. Easter, Cumberland, Md., assignors to Celanese Corporation of America, a corporation of Delaware No Drawing. Application January 22, 1944, Serial No. 519,353

1 Claim. (Cl. 260—475)

This invention relates to novel organic compounds and relates more particularly to certain esters and ether-esters of hexahydrobenzyl alcohol.

An object of our invention is the preparation of ester and ether-ester derivatives of hexahydrobenzyl alcohol.

Another object of our invention is the preparation of ester and ether-ester derivatives of hexahydrobenzyl alcohol which are useful in various commercial applications due to their plasticizing, surface active and other properties.

Other objects of our invention will appear from the following detailed description.

As is well known, the Diels-Alder condensation of acrolein with butadiene yields $\Delta^3$-tetrahydrobenzaldehyde

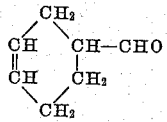

This unsaturated cyclic aldehyde is a highly reactive starting material for the development of new and valuable organic compounds. On oxidation of the above aldehyde, there may be obtained $\Delta^3$-tetrahydrobenzoic acid

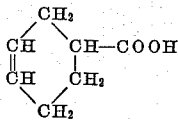

which, when reduced, yields hexahydrobenzoic acid

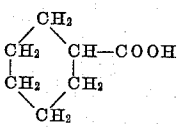

Under more vigorous conditions of reduction, however, not only is the aldehyde group reduced but the nuclear double bond of the $\Delta^3$-tetrahydrobenzaldehyde is saturated as well, and hexahydrobenzyl alcohol

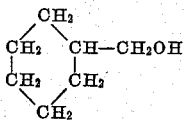

is obtained. Since this compound has an alcoholic hydroxyl group, it may be etherified, for example, with ethylene oxide, to yield a monoethylene glycol ether or it may be esterified.

We have now discovered that the esters and ether-esters of hexahydrobenzyl alcohol of the following general formula

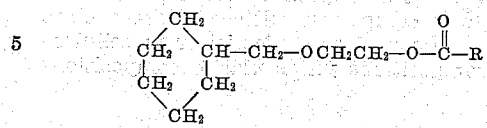

wherein R is a substituted or unsubstituted cyclic radical, form a valuable series of organic compounds which are suitable for use as plasticizers, waxes, synthetic intermediates, binding agents, solvents or lubricants. As examples of suitable acids with which the hexahydrobenzyl alcohol or monoethylene glycol ether thereof may be esterified to form said valuable esters, there may be mentioned $\Delta^3$-tetrahydrobenzoic acid, hexahydrobenzoic acid, naphthoic acid, tetrahydronaphthoic acid, phthalic acid, tetrahydrophthalic acid and hexahydrophthalic acid. The dicarboxylic acids may form mono- as well as di-esters with hexahydrobenzyl alcohol or with the monoethylene glycol ether thereof.

The novel esters of our invention may be prepared by reacting hexahydrobenzyl alcohol or the mono-ethylene glycol ether of hexahydrobenzyl alcohol with the desired acid or acid anhydride, preferably, in the presence of a suitable esterification catalyst such as anhydrous hydrogen chloride, sulfuric acid or p-toluene sulfonic acid. From 1 to 2 equivalents of hexahydrobenzyl alcohol or the mono-ethylene glycol ether thereof are reacted with from 1 to 2 equivalents of acid or anhydride. The esterification may be effected without the application of external heat by mixing the hexahydrobenzyl alcohol or the mono-ethylene glycol ether thereof with the desired acid, and then bubbling dry hydrogen chloride through the mixture until the reaction is completed. The completion of the reaction is indicated by the fact that no further heat is evolved from the reaction mixture. The product may be separated from the reaction mixture by distillation, extraction, crystallization or like method, or by a combination of those methods which are usually employed for the separation of pure compounds from reaction mixtures in which they are prepared.

In order further to illustrate our invention but without being limited thereto the following examples are given:

Example I 50 parts by weight of hexahydrobenzyl alcohol and 55 parts by weight of $\Delta^3$-tetrahydrobenzoic acid are mixed together and dry hydrogen chloride bubbled through the mixture. The hydrogen chloride is bubbled through until further evolution of heat ceases. The resulting reaction mixture is distilled under high vacuum and hexahydrobenzyl-$\Delta^3$-tetrahydrobenzoate is removed in the fraction boiling at 112 to 114° C. under a pressure of 8 mm. of mercury. The yield obtained is 88% of theoretical.

Example II 50 parts by weight of hexahydrobenzyl alcohol and 37 parts by weight of phthalic anhydride are mixed together, and dry hydrogen chloride gas is bubbled through the mixture until no further heat effect is noted. 100 parts by weight of a saturated aqueous solution of sodium bicarbonate are then added to neutralize any excess hydrogen chloride and unreacted phthalic acid. The di-hexahydrobenzyl phthalate formed is filtered from the solution, washed and dried. The product is a white crystalline solid having a melting point of approximately 104° C. This ester is fully compatible with cellulose acetate and when employed as a plasticizer in cellulose acetate compositions yields plastic compositions of excellent properties. Thus, for example, films plasticized with 33% of di-hexahydrobenzyl phthalate show an extension of about 21%.

Example III 50 parts by weight of the mono-ethylene glycol ether of hexahydrobenzyl alcohol, formed by reaction of hexahydrobenzyl alcohol with ethylene oxide, are mixed with 26 parts by weight of phthalic acid. Dry hydrogen chloride is bubbled through the mixture until esterification is complete, completion being indicated by the fact that the generation of heat ceases. The di-$\beta$-hexahydrobenzyloxyethyl phthalate is separated from the reaction mixture by filtration and is washed and dried.

It is to be understood that the foregoing detailed description is given merely by way of illustration and that many variations may be made therein without departing from the spirit of our invention.

Having described our invention, what we desire to secure by Letters Patent is:

Di-$\beta$-hexahydrobenzyloxyethyl-phthalate.

JOSEPH E. BLUDWORTH.
DONALD P. EASTER.